June 4, 1929.  T. M. HARDESTY  1,715,547
DRILL PIPE COUPLING
Filed May 25, 1926  4 Sheets-Sheet 1

Inventor
Thomas M. Hardesty
By Lyon & Lyon
Attorneys

June 4, 1929.  T. M. HARDESTY  1,715,547
DRILL PIPE COUPLING
Filed May 25, 1926  4 Sheets-Sheet 2
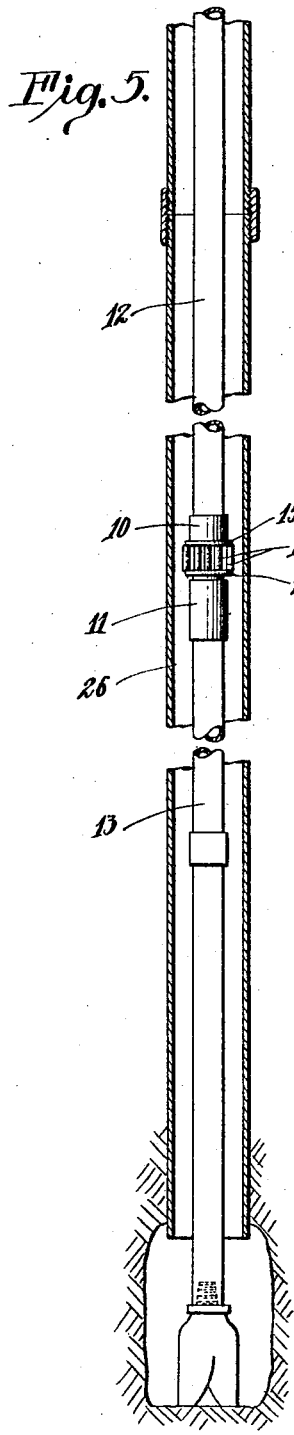
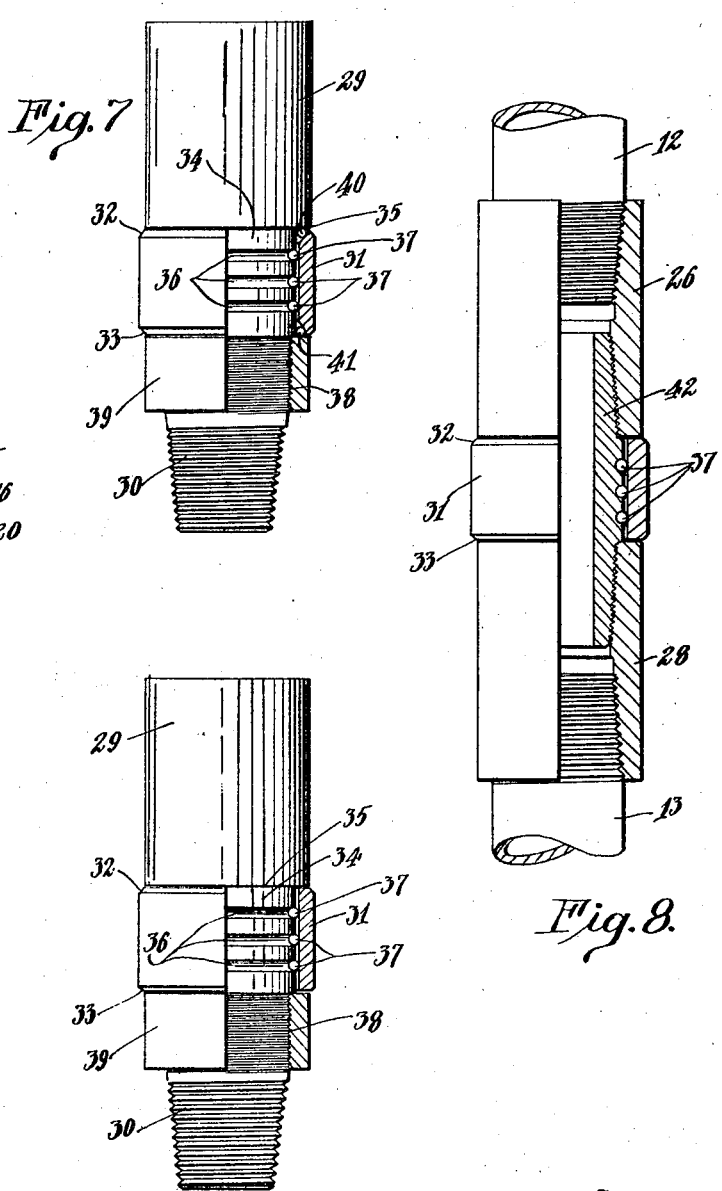
Inventor
Thomas M. Hardesty
By Lyon & Lyon
Attorneys June 4, 1929.   T. M. HARDESTY   1,715,547
DRILL PIPE COUPLING
Filed May 25, 1926   4 Sheets-Sheet 3

Inventor
Thomas M. Hardesty
By Lyon & Lyon
Attorneys

June 4, 1929.  T. M. HARDESTY  1,715,547
DRILL PIPE COUPLING
Filed May 25, 1926  4 Sheets-Sheet 4
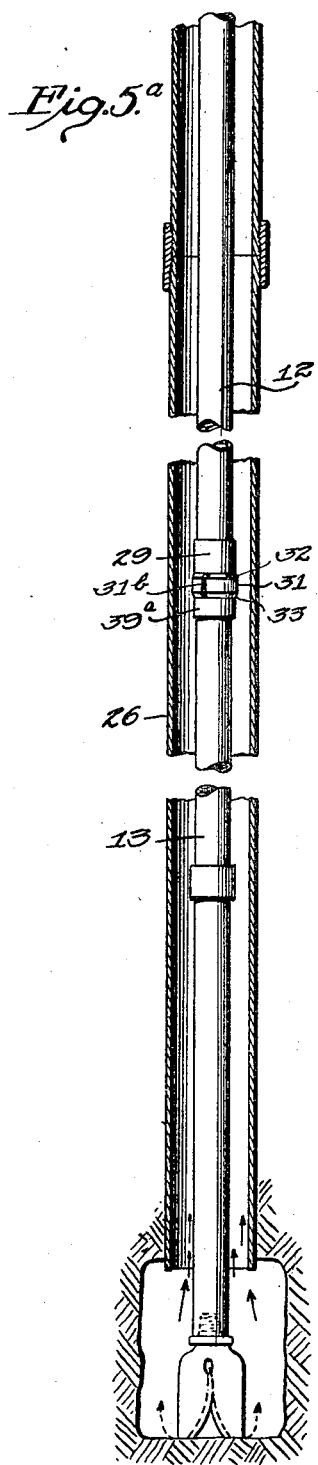
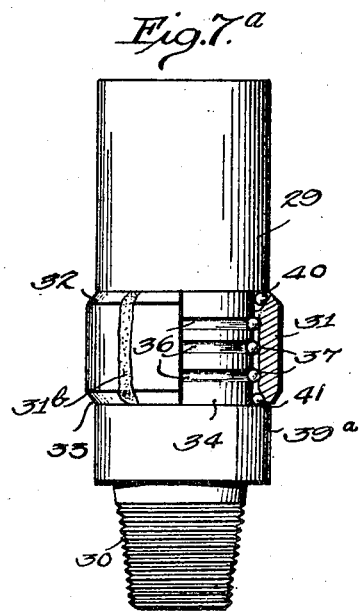
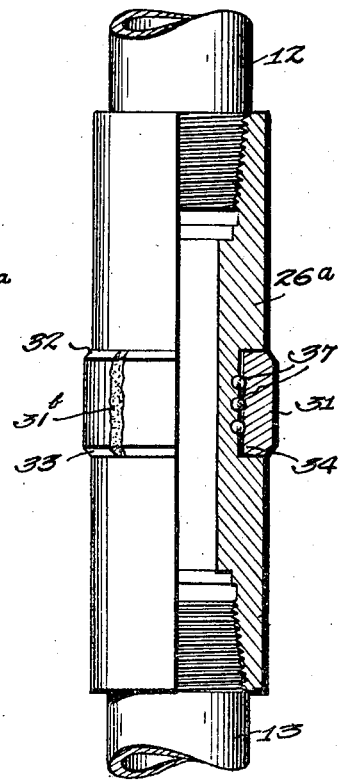
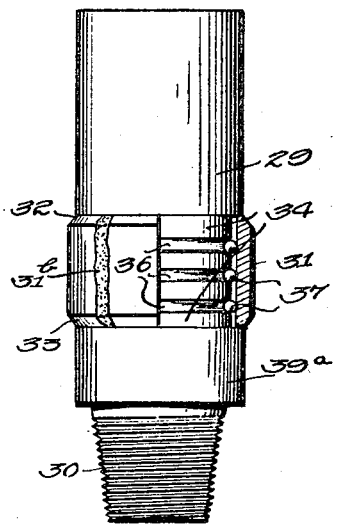
Inventor
Thomas M. Hardesty
By Lyon & Lyon
Attorney Patented June 4, 1929.

1,715,547

UNITED STATES PATENT OFFICE.

THOMAS M. HARDESTY, OF SANTA PAULA, CALIFORNIA.

DRILL-PIPE COUPLING.

Application filed May 25, 1926. Serial No. 111,491.

This invention relates to the art of hydraulic rotary system for drilling deep wells, and refers particularly to the drill pipes or stems and couplings employed therein. This application is a continuation in part of my copending application No. 77,272, filed Dec. 23, 1925.

In the hydraulic rotary system of drilling wells, the well is drilled by a drilling bit attached to a drill stem or drill pipe extending from the bit to the surface of the ground. This drill pipe may be several thousand feet in length. In addition to serving the purpose of supporting and rotating the drilling bit within the well hole, the drill pipe also operates or serves as a conduit for passing flushing fluid to the drilling tool. This flushing fluid operates and is relied upon as the sole means for removing the detritus, or other cuttings by the bit, as the hole progresses, and the fluid carrying the detritus must be permitted to flow back through the space between the drill pipe and the bore of the well casing to the point of final discharge at the surface of the ground, and without obstruction which would retard its velocity. This is absolutely necessary, as an obstruction to the free discharge of the flushing fluid and detritus would be fatal to the operation of a rotary hydraulic system of well drilling in which the pressure due to the great depths of these wells, is enormous. In the course of construction of a well by the hydraulic rotary system, the upper portion of the well is commonly housed or encased by a casing termed the well casing. The use of a well casing is two-fold, namely, to prevent the caving in of the surrounding walls of the well, and to prevent the entrance of any water from the surrounding strata penetrated by the well bore from entering the well, commingling with the oil therein, and from endangering the destruction of the entire oil field due to flooding the latter by said water. In drilling the well, part of the weight of the drill pipe is imposed upon the drill bit with the result that the drill pipe is caused to bend or assume a somewhat sinuous shape in the well hole, with the result that part of the drill pipe is rubbed against the inner wall of the well casing. Moreover, in drilling a well of any considerable depth, the well hole is never absolutely straight. This results in the drilling pipe being pressed against the well casing at one or more points in the well hole. The contact between the drill pipe and the well casing results in rapid wear of both the drill pipe and the well casing. This results not only in the heavy wear upon the drill pipe but is also accompanied with the danger that the well casing will be worn through, with the result that there is danger of the well casing collapsing and with the further result that any fluid, such as water shut off from the hole by the well casing, will be permitted to enter the well. Furthermore, the wear of the drill pipe upon the well casing is accompanied with the danger that the drill pipe may become severed in operation, leaving the lower portion of the drill pipe and the carried drill bit within the well hole.

Heretofore, the art has developed no adequate means for overcoming this wear between the well casing and drill pipe. Attempts have been made to reduce this wear by the provision of rubber collars and the like around the drill pipe or couplings of the drill pipe. These rubber collars are easily worn off the drill pipe, do not provide anti-friction surfaces, and have not proven generally satisfactory.

An object of the present invention is to provide a drill pipe of the type intended for use in the hydraulic rotary system of drilling wells which will not substantially wear the well casing upon contact between the drill pipe and well casing.

More particularly, the object of the present invention is to provide an anti-friction bearing in position to contact with the well casing and prevent wear between the casing and drill pipe under the conditions above referred to, namely, where the drill pipe is bent out of line or is whipped against the casing due to its rapid rotation and the resistance of the drill bit; or where the well casing is bent out of line as is frequently the case in well drilling methods, and where as a result the drill pipe and coupling contact with and rub the casing, tending to wear through the latter and to wear away and weaken the drill pipe and couplings. In the preferred form of the invention, the anti-friction bearing is mounted upon the so-called tool or joints of the well casing which tool joints are employed to interconnect the different sections of the drill pipe.

Various further objects and advantages of the present invention will be apparent from a description of a preferred form or forms of drill pipe and tool joints therefor embodying the present invention. Reference is therefore made to the accompanying drawings, in which I have illustrated several forms of my invention.

In the drawings:

Figure 1 is a vertical section through a tool joint mounted on a drill pipe on which the anti-friction bearing of the preferred construction has been placed, Figure 2 is a horizontal section taken on the line 2—2 of Figure 1, Figure 3 is a perspective view of the anti-friction bearing, Figure 4 is a sectional view illustrating the anti-friction bearing as being mounted upon a coupling for drill pipe constituting a slight modification of the invention, Figure 5 is a sectional elevation of a well hole and casing disclosing a drill pipe embodying the present invention located therein, Fig. 5a is a similar view of a modification of the invention, Figure 6 illustrates a slightly modified form of the invention employing a revolvable sleeve that is supported by anti-friction bearings, Fig. 6a illustrates a slight variation of the modified form shown in Fig. 6, Figure 7 is a further modified form of tool joint of the revolvable sleeve type illustrating a somewhat different anti-friction bearing construction, Fig. 7a shows a slight variation of the modification shown in Fig. 7, Figure 8 is a further modification of the drill pipe showing the anti-friction bearing showing the anti-friction means mounted on a body of somewhat different shape.

Fig. 8a illustrates a slight variation of the modification shown in Fig. 8,

Figure 2:
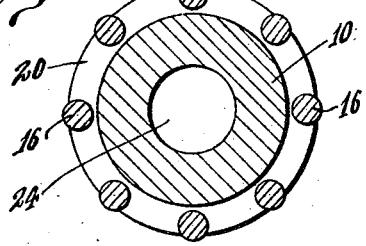
Figure 3:
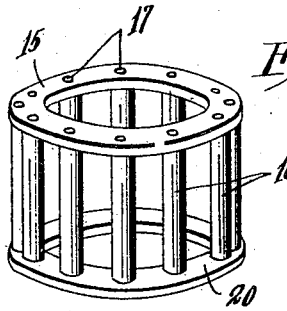
Figure 1:
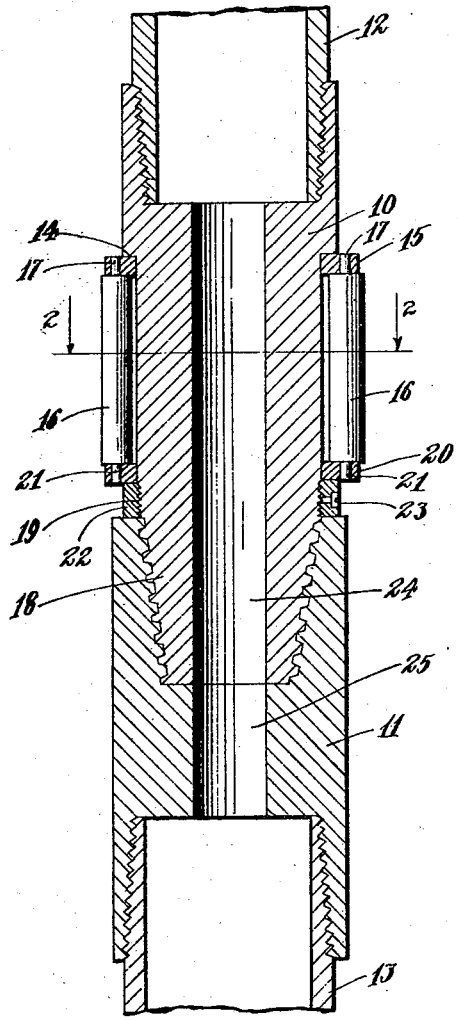

Referring to the drawings, wherein similar reference characters designate similar parts throughout, the form of the invention illustrated in Figures 1 to 3 inclusive comprises a tool joint having a pin section 10 and a box 11, which connect the adjacent ends of adjacent sections of drill pipe 12 and 13. On the pin section 10, there is formed an annular shoulder 14 against which is positioned a ring 15. Rollers 16 have their ends reduced to provide pintles 17, which are rotatable in the ring 15. Adjacent the threaded end 18 of the pin section, there are formed threads 19. A second ring 20 is slipped over the pin section and receives the pintles 21 formed on the lower end of each of the rollers. A locking ring 22 is threaded onto the threads 19, serving to lock the ring 20 in place. This locking ring may be locked against rotation or unscrewing by one or more set screws 23. It will be apparent that the locking ring 22, in place of being threaded to the pin section 10, may be otherwise held in position such, for example, as being shrunk to the pin section 10. The pin section 10 and box 11 are shown as having registering passages 24 and 25, respectively, through which hydraulic fluid may flow in passing from the section 12 to the section 13 of the drill pipe.

From the above construction, it will be readily appreciated that the bearing can be easily and quickly applied to the pin section and can be easily and quickly removed; also, the rollers 16 are rotatable about substantially vertical axes providing an anti-friction bearing which, when it engages the interior of the well casing 26, as illustrated in Figure 5, will effectually prevent wear between the well casing and drill pipe, and also reduces friction thereof required to rotate the drill pipe. An important feature of the invention is in the provision of the anti-friction or bearing means extending to a larger diameter than any other part of the drill pipe but of substantially smaller size circumferentially than the interior of the drill pipe, so that said anti-friction or bearing means will always be caused to engage the interior of the well casing instead of the other parts but will provide a sufficient space between its outer surface and the interior of the casing to permit free and unobstructed discharge of the flushing water, and its contained detritus.

Figure 4:
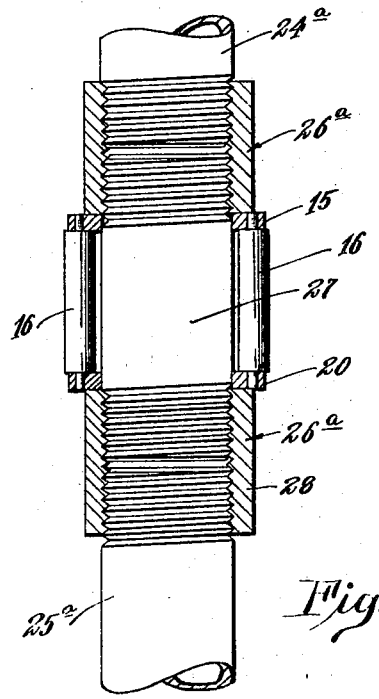

In the modification of the invention shown in Figure 4, the bearing is embodied upon a coupling for pipe. In this modification, the adjacent ends of adjacent sections of drill pipe are illustrated at 24a and 25a. Normally, these ends are connected as by a single coupling member or collar 26a. In placing the anti-friction means therein, a short section of drill pipe or nipple or joint member 27 is positioned between the adjacent ends 24a and 25a, and the collar 26a connects the upper end of the nipple 27 to the lower end of the section 24a. This collar provides a shoulder for the upper ring 15 of the bearing, in which the pintles of the rollers 16 are mounted. A second collar 28 serves to maintain the lower ring 20 in place. The second collar 28 also serves to connect the lower end of the nipple 27 to the drill pipe section 25a.

Now, referring to the embodiment of the invention illustrated in Figure 6, I have shown a tool joint or connecting member 29, the lower end of which is shown as provided with the joint pin 30, which may be connected as the pin of the part 10 to a section of drill pipe, the upper end of the tool joint or connecting member 29 being interiorly threaded for connection with an upper section of drill pipe. These threads are not shown in the form of the invention shown in Figure 6 and also are not shown in the form of the invention shown in Figures 7, 9, 10 and 11, it being understood that the threads are preferably similar to those shown at the upper end of the pin member 10 of Figure 1.

The anti-friction means is preferably mounted upon the joint member 29 and comprises a cylindrical sleeve 31, the upper and lower ends of which are tapered, as indicated at 32 and 33. The beveling or tapering of the ends of the sleeve is very important, in that as these devices are lowered in a well casing provided with couplings the bevels at the ends of the sleeves prevent the latter from catching upon the ends of adjacent sections of the well casing, or any interior obstruction, which would thereby interfere with the raising and lowering of the drill pipe. Moreover, such a contact between the rotatable bearing sleeve 31 and the ends of the well casing would be accompanied by the danger of breaking off the bearing sleeve entirely, or of seriously damaging the same. Said sleeve is positioned on the member 29 on a reduced portion 34 of the member, below the annular shoulder 35. The reduced portion 34 of the member 29 is indicated as provided with a plurality of annular grooves 36 which receive circular series of balls 37 engaging the sleeve 31 to provide anti-friction means between it and the member 29. Below the rotatable sleeve 31, the member 29 is further reduced and threaded, as at 38, to which is threaded a locking member or sleeve 39, which provides a lower shoulder below the rotatable sleeve 31. It is understood that this locking member 39, in place of being threaded to the member 29, may be held in place in any other desired manner, such as being shrunk onto the pin member 29 or may constitute an integral part of said member, the rotatable sleeve in such case being placed in position by being originally formed in two separate pieces and welded together after being positioned in place, as illustrated in Figs. 5ª, 6ª, 7ª, and 8ª.

Referring to Figure 7, I have shown certain additional features which may be incorporated in the form of the invention illustrated in Figure 6, said form of the invention differing therefrom in that a circular series of balls 40 are placed between the rotatable sleeve 31 and the shoulder 35 and another circular series of balls 41 placed between the rotatable sleeve 31 and the locking member or portion 39. For this purpose, the upper and lower ends of the rotatable sleeve are shown as cut in to accommodate said balls.

The forms of the invention shown in Figures 6 and 7 inclusive, have an advantage over that shown in the previous figures in that they include a solid rotatable sleeve which covers and protects the bearing or anti-friction members of the joint so that the tremendous stresses set up in the drilling actions and in the lowering and raising of the drill pipe from the well will not readily damage the anti-friction means.

The rotatable sleeve type of anti-friction drill pipe may have the rotatable sleeve placed or connected to the drill pipe sections in various manners. For example, in Figure 8, I have illustrated the anti-friction means as mounted upon a connecting member or nipple 42 similar to the the nipple 27 of the form shown in Figure 4, the rotatable bearing sleeve being indicated at 31 as provided with anti-friction engagement with the nipple 42 in the form of balls 37 similar to those illustrated in connection with Figures 6 and 7. This nipple is illustrated as connected to drill pipe sections 12 and 13 by the collars 26 and 28 in a similar manner to that of Figure 4.

The constructions illustrated in Figs. 5ª to 7ª, inclusive, are the same as those illustrated in Figs. 5 to 7, inclusive, except that in Figs. 5ª, 6ª and 7ª, the locking member or sleeve 39ª constitutes an integral part of the pin member 29, and in this case, instead of employing a separately threaded sleeve, as 39, in Figs. 6 and 7, which is threaded to the pin member, the latter is provided with a groove 34 within which is formed the plurality of ball raceways 36, as heretofore described, and the rotatable sleeve 31 is originally formed of two separate pieces which are welded together by the usual process of electric welding, or otherwise. One of these welded joints is shown at 31ᵇ. Fig. 8ª illustrates the same idea applied in lieu of the construction illustrated in Fig. 8, the collars 26 and 28 and nipple 42 being formed as a single, integral, collar 26ª, which is provided with a circumferential groove 34, as in Figs. 6ª and 7ª, within which are formed a plurality of ball raceways 36 to receive the anti-friction balls 37, and the sleeve 31 being composed originally of two pieces which are welded together in the assembly of the device, as shown at 31ᵇ.

In the forms employing a sleeve the flow of the circulating mud fluid is through the space between the outside diameter of the sleeve and the inner wall of the well casing. In the constructions illustrated in Figs. 6, 7, 8, 5ª, 6ª, 7ª, and 8ª, the sleeve is so mounted in the recess of the coupling as to seal the anti-friction bearings and to prevent the mud fluid from passing between the sleeve and the coupling and through the anti-friction bearings. Under these forms, accordingly, abrasion and clogging of the bearings, by the mud fluid is prevented, and hence the bearings are protected.

Figure 9:
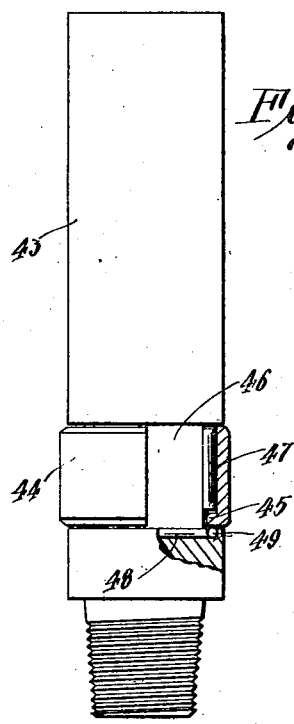
Figure 9 is a further modified form of tool joint.

In the modification shown in Figure 9, the anti-friction means for the drill pipe is shown as mounted upon pin section 43, said anti-friction means comprising a rotatable sleeve 44, the lower end of which is turned in as at 45. This rotatable sleeve 44 is positioned in an annular cylindrical groove 46 in the pin section 43 and between the rotatable sleeve 44 and pin section 43 are rollers 47 vertically disposed, which provide the anti-friction or bearing means between these parts. Below the inturned end 45 of the bearing sleeve, there is a groove 48 in the pin section for accommodating ball bearing members 49 which engage the inturned end or flange 45 in the rotatable sleeve 44, thus providing anti-friction bearings for the sleeve in both the horizontal and vertical direction.

It is understood that in this form of the invention, the portion of the pin body below the rotatable sleeve which engages and holds the rotatable sleeve from being removed from the body may, in place of being formed integral with the body, constitute a locking sleeve similar to that shown at 39 in Figures 6 and 7 inclusive, the sleeve being held in place either by threads or by being shrunk onto the body or by any other preferred means. With the construction as shown in Figure 9, the rotatable sleeve 44 should be made in separate pieces and welded together after it is placed upon the pin section 43.

Figure 10:
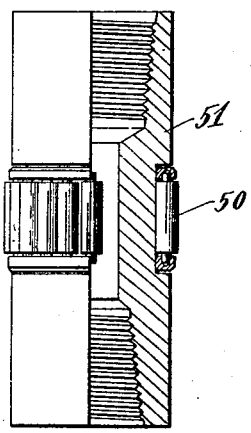
Figure 10 is a further modified form of tool joint.

Now referring to the embodiment of the invention shown in Figure 10, I have illustrated anti-friction means 50 similar to that shown in connection with Figures 1 to 5 inclusive, which anti-friction means, in place of being mounted upon a pin section, are mounted upon a double box joint 51.

Figure 11:
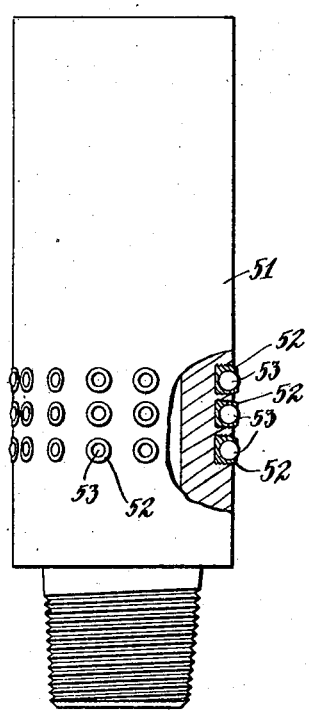
Figure 11 is a further modified form of tool joint.
Figure 12:
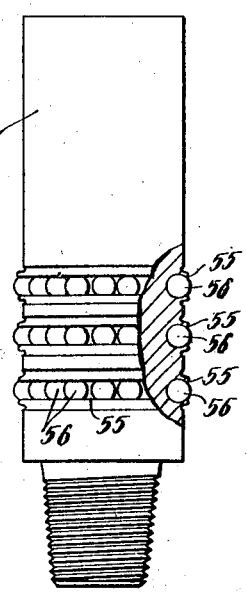
Figure 12 is a further modified form of tool joint illustrating the anti-friction means as mounted upon a double box joint.

Referring to the forms of the invention shown in Figures 11 and 12, I have there illustrated the invention as comprising anti-friction means formed solely of balls without the necessity of employing any bearing sleeves. In Figure 11, the pin section 51 is shown as having a multiplicity of individual ball housings 52 threaded into suitable openings in the pin section and mounting individual balls 53.

In the form of the invention shown in Figure 12, the pin section 54 is shown as provided with a plurality of annular grooves 55 which includes a circumferential series of balls 56, the edges of the grooves 55 being crimped over the balls 56 to hold the same in place.

From the foregoing description, it will be readily seen that the invention may be embodied in numerous forms and the invention is, therefore, not limited to the particular forms herein described for the purpose of illustrating the invention, but the invention includes all such modifications, changes, and substitutions as come within the scope of the appended claims.

I claim:

1. A pipe coupling for connecting drill pipe operating within a well casing, said pipe coupling having an annular recess therein, a revolvable sleeve mounted in said recess, and having an outside diameter larger than that of the remainder of said coupling, the sleeve being sufficiently smaller than the interior of the well casing to provide for the free passage of the flushing water and detritus.

2. A pipe coupling for connecting drill pipe operating within a well casing, said pipe coupling having an annular recess therein, a revolvable sleeve mounted in said recess, and having an outside diameter larger than that of the remainder of said coupling, and sufficiently smaller than the interior of the well casing to provide for the passage of the flushing water and detritus, and bearing means engaging the body of the pipe coupling and mounting said rotary sleeve.

3. A pipe coupling for connecting drill pipe operating within a well casing, said pipe coupling having an annular recess therein, a revolvable sleeve mounted in said recess, and having an outside diameter larger than that of the remainder of said coupling and sufficiently smaller than the diameter of the well casing to provide for the free passage of the flushing water and detritus, and bearing means operating for receiving both radial and end thrust, engaging the body of the coupling and mounting said sleeve.

4. A pipe coupling for connecting drill pipe operating within a well casing, said pipe coupling having an annular recess therein, a revolvable sleeve mounted in said recess, and having an outside diameter larger than that of the remainder of said coupling and smaller than the diameter of the well casing, a plurality of circumferential grooves in the body of the coupling and a plurality of circular series of balls mounted in said grooves and revolvably mounting said sleeve.

5. A pipe coupling for connecting a drill pipe operating within a well casing, said pipe coupling having a plurality of circumferential grooves in its body, and a plurality of balls, part of which at least are mounted within said grooves, a rotating sleeve revolvably mounted by said balls, said sleeve having an outside diameter larger than the body of the coupling and smaller than the diameter of the well casing in which the coupling is to operate, the bearing means being adapted for receiving both radial and end thrust.

6. A device for protecting a well casing from wear from a rotary string, comprising a rotating sleeve for said rotating string having an outside diameter larger than the remainder of the string and sufficiently smaller than the inside diameter of the well casing to provide for the free passage of the flushing water and detritus, and bearing means between said sleeve and rotary string adapted for receiving both radial and end thrust.

7. A device for protecting a well casing from wear from a rotary string, comprising a sleeve revolvably mounted upon said rotary string having an outside diameter substantially smaller than the inside diameter of the well casing and larger than the diameter of the remainder of the string, a plurality of circular series of ball bearings mounting said sleeve upon said string, the ball bearings being disposed in circumferential grooves in the body of the string.

8. A device for protecting a well casing from wear from a rotary string of drill pipe, comprising a rotating sleeve mounted upon said string and having an outside diameter larger than the remainder of the string, said sleeve being beveled upon its outside surface at opposite ends, and anti-friction bearing means between the interior of said sleeve and said string.

9. A device for protecting a well casing from wear from a rotary string of drill pipe, comprising a coupling member provided with an annular recess, a plurality of ball raceways in said recess, ball bearings therein, a sleeve seated in the recess and engaging said bearings, said sleeve being confined against longitudinal movement and projecting annularly beyond the body of the coupling member and being of substantially less size than the space enclosed by the casing so as to provide free outflow for the flushing water and detritus.

10. A device for protecting a well casing from wear from a rotary string of well pipe, comprising a coupling member provided with an annular recess, anti-friction bearing members in said recess, a sleeve seated in and closing the recess and engaging said bearing members, said sleeve composed of a plurality of sections joined together.

11. A device for protecting a well casing from wear from a rotary string of well pipe, comprising a coupling member provided with an annular recess, anti-friction bearings in said recess, a sleeve seated in and closing the recess and engaging said bearings, said sleeve being composed of a plurality of segmental sections joined at their abutting edges and externally of a size greater than the coupling member but substantially less than the diameter of the interior of the well casing.

12. A device for protecting a well casing from wear from a rotary string of drill pipe in a hydraulic well drilling system, comprising a coupling member, anti-friction bearings mounted in said member, the bearings projecting beyond the coupling, but collectively of a size sufficiently less than the diameter of the casing to permit free discharge of the mud-laden fluid and detritus between said bearings and casing.

Signed at Los Angeles, California, this 7th day of May, 1926.

THOMAS M. HARDESTY.